United States Patent [19]

Kreinik

[11] 4,090,187

[45] May 16, 1978

[54] TELEVISION TITLING SYSTEM FOR PRODUCING OVERLAPPING CHARACTERS

[75] Inventor: Stephen Kreinik, Monsey, N.Y.

[73] Assignee: Thomson-CSF Laboratories, Inc., Stamford, Conn.

[21] Appl. No.: 684,558

[22] Filed: May 10, 1976

[51] Int. Cl.[2] .......... G06K 15/20

[52] U.S. Cl. .......... 340/324 AD; 364/521

[58] Field of Search .......... 340/324 AD, 324 A; 178/15, 23 R, 30; 354/6, 7, 8

[56] References Cited

U.S. PATENT DOCUMENTS

| | | | |
|---|---|---|---|
| 3,712,443 | 1/1973 | Mathews | 340/324 A |
| 3,729,714 | 4/1973 | Heard | 340/324 A |
| 3,731,610 | 5/1973 | Kyte | 354/6 |
| 3,781,849 | 12/1973 | Baron et al. | 340/324 AD |

*Primary Examiner*—David L. Trafton
*Attorney, Agent, or Firm*—Martin Novack

[57] ABSTRACT

The invention is applicable to an apparatus which receives a sequence of character-representative signals and which generates stroke signals that are suitable for controlling a scanned display to present the sequence of characters on the display. This type of system typically includes timing generator means for generating timing signals which are synchronized with the display scan and character storage means for storing the character-representative signals and periodically reading out character-representative signals which correspond to a character in the sequence. This type of apparatus also typically includes stroke generating means responsive to the timing signals and the character-representative signals for producing a stroke of a character to be displayed. In accordance with the invention there is provided a system for presenting predetermined adjacent characters in overlapping positions on the display. Means are provided for sensing the successive occurrence of at least one preselected pair of character-representative signals and for thereupon generating an occurrence indication. Further provided are means responsive to the occurrence indication for accelerating the readout of the stroke of the second-occurring of the preselected pair of characters. In the preferred embodiment of the invention, means are provided for storing the last-occurring portion of the stroke of the first-occurring of the preselected pair of characters. The stored stroke portion is read out in conjunction with the stroke of the second-occurring of the preselected pair of characters.

9 Claims, 4 Drawing Figures

TELEVISION TITLING SYSTEM FOR PRODUCING OVERLAPPING CHARACTERS

BACKGROUND OF THE INVENTION

This invention relates to a television titling apparatus that receives digital input signals corresponding to title information and generates video signals for displaying the information in readable form and, more particularly, to such an apparatus wherein predetermined adjacent characters are presented in overlapping positions on a display.

Systems for converting digital title information into video signals that are suitable for display in readable form are currently in widespread use. These systems are employed, for example, to provide title information alone on a display screen, such as is typically done with financial data. Title information may also be generated for display in conjunction with conventional television picture information. This is generally accomplished by combining the video picture signal and the video title signal using known keying techniques.

A system that receives digitally coded characters and generates character video signals suitable for display using a television raster scanning pattern is disclosed in the U.S. Pat. No. 3,422,420 of R. J. Clark. In the Clark system the received digitally coded input character signals to be displayed in a row are stored in ordered positions in recirculating shift registers. Various timing signals, synchronized with the display scan, are generated in repetitive sequences and effectively divide the display scan into a plurality of "character space areas" of predetermined equal size. A character pattern or outline trace is formed in a character space area on the display device by blanking and unblanking the scanning beam as the beam traverses the display device. Thus, each character is formed on the display as a series of "slices" or "strokes" during successive scanlines. The character signals are read out of the recirculating shift registers one at a time, and a "character generator" subsystem generates the appropriate video stroke signals (blanking and unblanking commands) which are distinctive of the character being read out. The timing signals control the shifting and reading out of the character signals in the recirculating registers such that a new character signal is read out each time the display scan passes into a new character space area. After being read out, each character signal is restored in the recirculating registers to be recalled during the next display scanline when the next strokes of each character in the display row are generated. The retentivity of vision of the eye is relied upon to build up the impression of a complete character from the separate character strokes that are produced during each scanline.

In the U.S. Pat. No. 3,740,743 of S. N. Baron there is disclosed a television-compatible titling apparatus which generates proportionally spaced characters for display; i.e., characters which have different sized "character spaces". For example, a "W" has allotted a substantially larger character space than an "I". In the apparatus of that patent the recirculating storage is shifted in response to spacer timing signals generated by a spacer detector which is responsive to the character signals and includes means for generating spacer timing signals which are a function of the width of the character to be instantaneously displayed. A stroke generator which is responsive to the timing signals and the spacer timing signals generates a stroke of a character being instantaneously displayed.

The technique of the described Baron patent yields more pleasing titling displays, but a problem still exists in achieving character titling which is completely aesthetically pleasing; viz., the lack of the ability to display adjacent characters with "overlapping" portions. For example, consider momentarily the characters illustrated in FIG. 4. It is seen that each character occupies a given "character space". Although the spaces needn't be of constant size, as taught by the Baron patent, it is seen that there is no overlap of characters for compact presentation. In FIG. 3, the same letters are shown with overlapping portions. From the standpoint of producing characters using a television-compatible titling system which generates "strokes" or "slices" of each character during successive scanlines, it has generally been considered a complex problem to generate the type of titling shown in FIG. 3. This is because the overlapping adjacent characters "encroach" upon each other's character spaces. Thus, for each overlap situation the strokes of the successive characters need to be modified to achieve the desired patterns. This would seemingly necessitate significant additional complexity of the titling system and/or require a substantial increase in stroke memory size.

It is an object of the present invention to provide an apparatus wherein predetermined adjacent characters are presented in overlapping positions on a display, this being achieved without undue complexity or the addition of substantial memory requirements.

SUMMARY OF THE INVENTION

The invention is applicable to an apparatus which receives a sequence of character-representative signals and which generates stroke signals that are suitable for controlling a scanned display to present the sequence of characters on the display. This type of system typically includes timing generator means for generating timing signals which are synchronized with the display scan and character storage means for storing the character-representative signals and periodically reading out character-representative signals which correspond to a character in the sequence. This type of apparatus also typically includes stroke generating means responsive to the timing signals and the character-representative signals for producing a stroke of a character to be displayed. In accordance with the invention there is provided a system for presenting predetermined adjacent characters in overlapping positions on the display. Means are provided for sensing the successive occurrence of at least one preselected pair of character-representative signals and for thereupon generating an occurrence indication. Further provided are means responsive to the occurrence indication for accelerating the readout of the stroke of the second-occurring of the preselected pair of characters.

In the preferred embodiment of the invention, means are provided for storing the last-occurring portion of the stroke of the first-occurring of the preselected pair of characters. The stored stroke portion is read out in conjunction with the stroke of the second-occurring of the preselected pair of characters.

Further features and advantages of the invention will become more readily apparent from the following detailed description when taken in conjunction with the accompanying drawings.

DESCRIPTION OF THE PREFERRED EMBODIMENT

Figure 1:
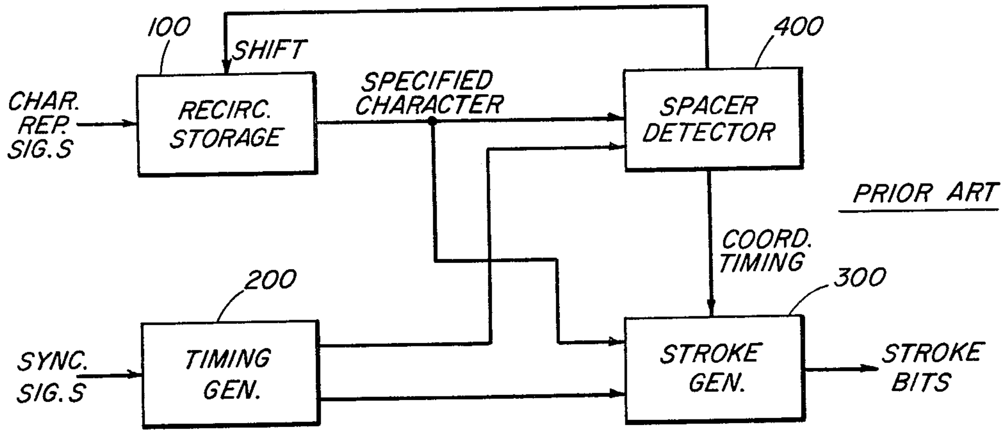
FIG. 1 is a simplified block diagram of a prior art television-compatible titling apparatus.

Referring to FIG. 1, there is shown a simplified block diagram of a television-compatible titling apparatus of the type disclosed in the above-referenced U.S. Pat. No. 3,740,743. An input sequence of character representative digital signals is received by a storage means 100, such as a bank of recirculating shift registers or a random access memory (RAM). The input-character representative signals are typically derived from a keyboard, but may also be derived from a computer or any suitable source. In a particular embodiment described in the above-referenced patent, the storage means 100 includes a six level shift register having a plurality of stages, the number of stages being determined by the maximum number of characters to be ultimately displayed in a row on a display device, for example 20 stages. The purpose of the storage means 100 is to "call-up" a character at a time when a stroke thereof is to be presented, this typically occurring once during each of a sequence of scan lines which depend upon the position on the diaplay at which the particular character is to be reproduced. Upon the appropriate commands, the six bits representative of the character in the last stage of the shift register are read out and then restored to the first stage of the register to be recirculated. The character read out is referred to as the "specified character" and its representative bits or signals are referred to as the "specified character signals". This is the character whose stroke is to be generated at a particular reference time.

A timing generator means 200 receives synchronizing signals related to the composite television signal to be generated; viz., the vertical and horizontal sync signals. The timing generator means includes basic clock, such as a 10 megacycle keyed oscillator which generates clock pulses every hundred nanoseconds. The oscillator is keyed by the horizontal sync signal. The timing generator also includes various counters which keep track of the number of lines scanned by the display up to a given time. When the video scan is in an area in which the row of characters is to be displayed, the counters produce signals that indicate which line of the row is being scanned.

A stroke generator 300 receives the specified character signals and line information from the timing generator means, and in response thereto generates stroke bits suitable for controlling an ultimate display to produce the appropriate stroke of the specified character. The stroke generator means typically includes a memory, such as a "read only memory" (ROM) or a "random access memory" (RAM) which is addressed by the received character information and by line information. For example, if the received information indicates that the specified character is a capital "M", and that the present scan line is the top line of the "M", then the memory output stroke bits will be sequential signals instructing the ultimate display scanning beam to turn "on" and then "off" two times in succession to produce the top slice of an "M".

The specified character signals are also received by a spacer detector 400 which determines the width of the specified character and generates a spacer timing signal which depends upon the time when the horizontal scan passes out of the display area needed to produce the specified character. The spacer timing signals are used to shift the recirculating storage 100 so that the next character in the sequence becomes the new "specified" character in the last stage of the recirculating storage 100. The appropriate stroke of the new specified character is then generated. The spacer detector also generates a coordinating timing signal, synchronized with the spacer timing signal, for controlling the timing associated with the generation and readout of stroke bits. For further details of operation, reference is made to the above-referenced U.S. Pat. No. 3,740,743, it being understood that only those portions of a prior art titling apparatus which are necessary for understanding of the present invention have been described herein. Also, it will be appreciated that the present invention is applicable to various types of titling equipment (with or without a "spacer detector" and proportional spacing) and the system of the above-referenced patent is utilized for purposes of illustration only.

Figure 2:
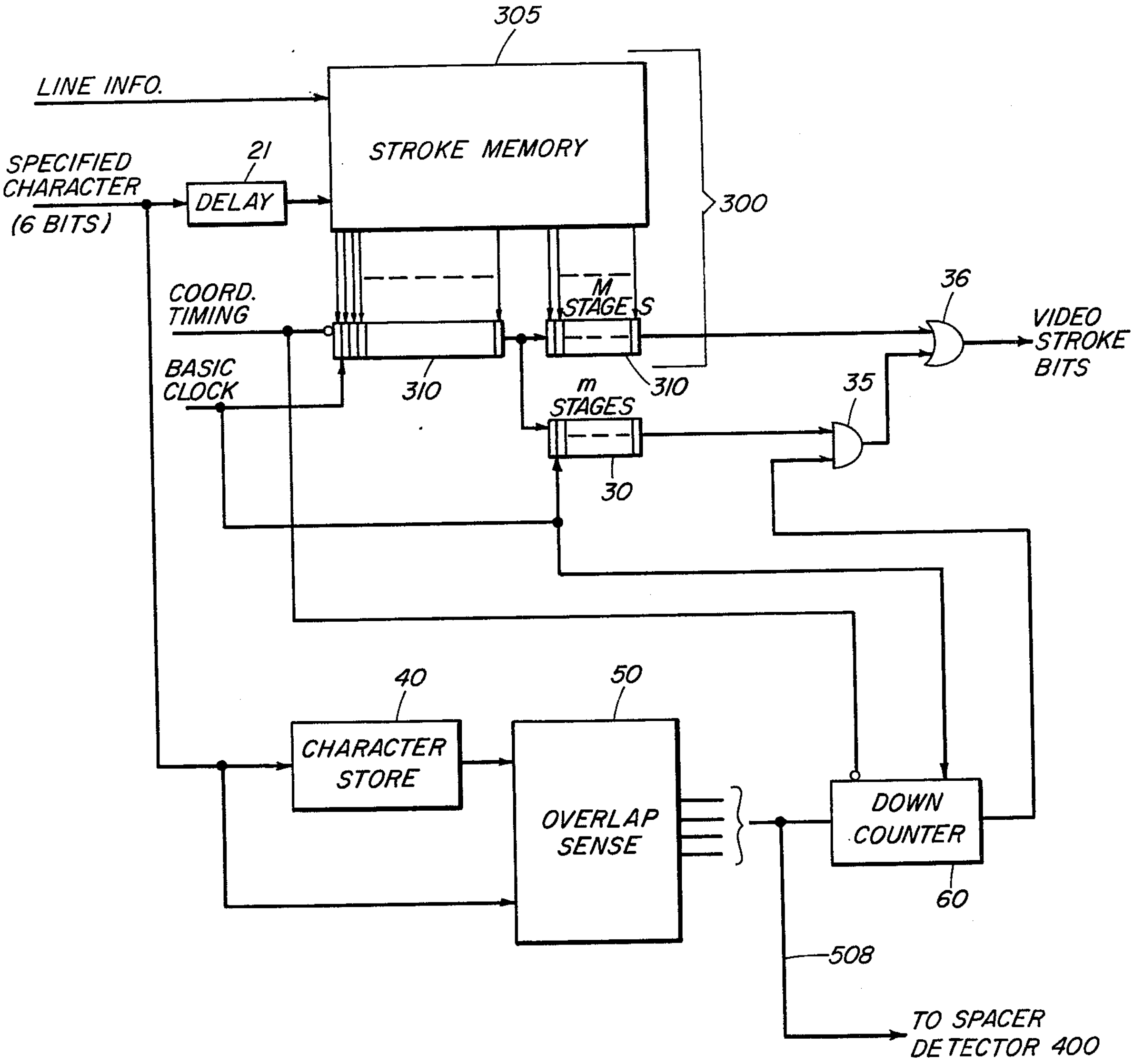
FIG. 2 is a block diagram of a subsystem in accordance with an embodiment of the invention.

Referring to FIG. 2, there is shown a block diagram of a subsystem in accordance with the invention, the subsystem being utilized in conjunction with television titling apparatus of the type described in conjunction with FIG. 1. Consistent with FIG. 1, line information and the specified character bits are coupled to a stroke generator 300, typically comprising a stroke memory 305, which may be a ROM or a RAM, and a parallel-in-serial-out register 310. The specified character bits are coupled to the stroke generator 300 via a delay 21 which is adapted to account for propagation delays in the system. In the prior art, the stroke generator 300 typically operates by dumping stroke bits in parallel into the shift register 310, whereupon the stroke bits are shifted out serially and, for example, combined with program video to form a composite video signal. As noted in conjunction with FIG. 1, the readout of stroke bits from register 310 is controlled by a coordinating timing signal from the spacer detector 400, and the register 310 is clocked by the basic clock from timing generator 200. In accordance with the invention, an auxiliary shift register 30, having M stages, is connected in parallel with the last M stages of the register 310, which is depicted in FIG. 2 as having two sets of stages in series. The output of auxiliary register 30 is coupled to one input of an AND gate 35, the output of which is one input to an OR gate 36. The other input to OR gate 36 is the output of shift register 310.

The specified character, in addition to being coupled to the stroke generator 300 via delay 21, is also coupled to a character store module 40 and an overlap sense unit 50. The output of the character store module 40 is a second input to the overlap sense circuit 50. The purpose of the character store module 40, which may be a six bit register, is to store the specified character until the occurrence of the next specified character which is read into the character store module 40, whereupon the previous specified character is read into the overlap sense unit 50. The overlap sense unit 50 typically comprises a suitable memory, such as a RAM or a ROM which receives the six bits of the "specified character"

and the six bits of the "previous specified character" (from module 40) and generates an output signal depending on the particular sequence of the two successive characters it receives. In particular, the unit 50 is preset to look for particular pair sequences of characters which require "overlap" for an aesthetically pleasing graphical presentation. An example of pair sequences in this category are "WA", "LT", "VA", "LY", "AT", "PA", "TA", "YA", "FA". The amount of overlap as between characters can be constant for all cases but, more preferably depends upon the particular shapes of the characters in each pair sequence. In the present embodiment, the amount of overlap for each applicable pair sequence is preset in the memory 50. The memory 50 generates four output bits which are a binary representation of from zero to 15 time slots (clock pulses) of overlap for the particular character pair sequence which has been received. For pair sequences of characters which involve no overlap (which is the case for the majority of pair sequences) the output count from the overlap sense memory 50 will be zero on each of the four output lines; viz., "0000" which indicates no overlap in the present embodiment. Thus, "0000" is the normal output state of overlap sense memory 50 which produces an output count other than "0000" only when the character codes for particular pair sequences are received at its input.

The output of the overlap sense unit 50 is loaded into a down counter 60 which is enabled by the coordinating timing signal from spacer detector 400 (the same timing signal which initiates readout of the stroke bits from register 310). Once enabled, the downcounter is clocked by the system's basic clock. The output of the downcounter 60 is coupled as an enabling input to AND gate 35 and serves to enable the gate 35 as it counts down to zero. The AND gate 35 is disabled when the downcounter 60 reaches zero or stays at zero.

Figure 3:
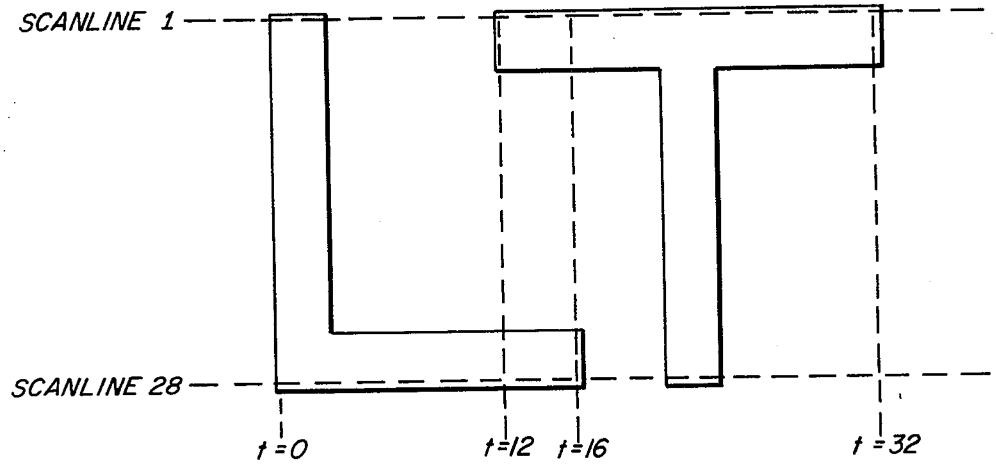
FIG. 3 illustrates overlapping characters of the type which can be generated utilizing the invention.
Figure 4:
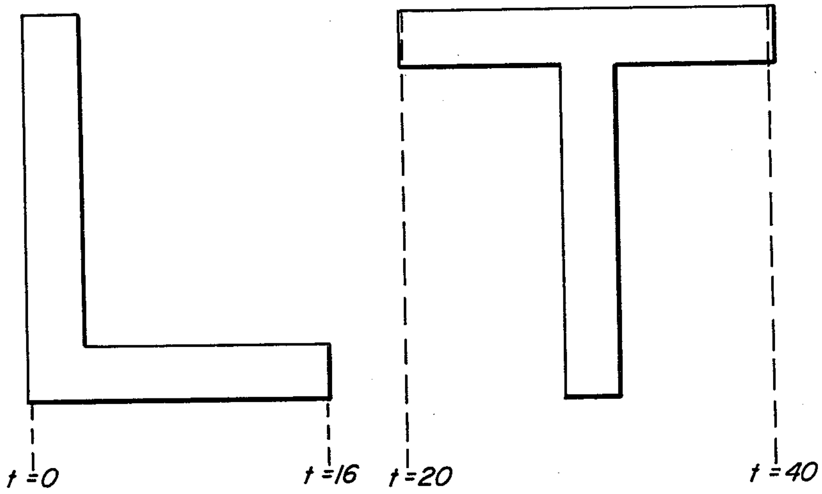
FIG. 4 represents non-overlapping characters of the type generated by prior art systems.

Operation of the subsystem of FIG. 2 is as follows: Assume that a character pair sequence which is to have inter-character overlap, such as "LT", is received. Reference is made to FIG. 3 to better understand the timing for this example. Assume that an "L" has a character space (on the ultimate display) which is 16 clock pulses or time slots wide and a character "T" has a character space which is 20 time slots wide. Also, in normal operation, and as described in the above-referenced patent, there are normally 4 time slots of inter-character space between characters. Thus, in the prior art the characters would be presented as shown in FIG. 4, wherein it is assumed that the character space for the "L" begins at a reference time $t = 0$. In such case, and referring to a portion of FIG. 2, the stroke bits for the "L" would begin being clocked out of register 310 at $t = 0$ and the last bit would be clocked out at $t = 16$. The stroke bits for the "T" would then be dumped into the register 310 and clocked out between $t = 20$ and $t = 40$. Referring again to FIG. 3 and the full subsystem of FIG. 2, upon receipt of the character-representative signals for the "T" the character-representative signals for the "L" (the previous "specified character") will be read out of the character store 40 so that the overlap sense unit 50 will receive the 12 bits (six for each character) representative of the sequence of characters "LT". In this example, the pair sequence "LT" is assigned 8 bits of overlap, as seen in FIG. 3; i.e., the four bit inter-character space is eliminated and the "T" overlaps the "L" by four spaces, thereby totalling eight overall bits of "overlap" as compared to the prior art situation (FIG. 4). Accordingly, the memory 50 will be preset to read out a count of "0100" (8 in decimal form) which is, in turn, loaded into the downcounter 60.

In accordance with the invention, the readout of the "T" (the second of the pair sequence) is accelerated and this is accomplished, in part, by effectively "shortening" the character space of the first character of the pair sequence (the "L"). Accordingly, the amount of overlap which is output from the overlap sense memory 50 is coupled via the line 50B to the spacer detector 400 (FIG. 1) to indicate to the spacer detector that the normal character space for an "L" should be shortened by 8 clock pulses (for this case). Of course, for pair sequences with different preselected amounts of overlap, the output of overlap sense memory 50 will indicate the appropriate "shortening" number to the spacer detector 400.

As a consequence of the "shortening" indication to the spacer detector, the "T" will become the new "specified character" read into stroke memory 305 8 clock pulses sooner than usual. Thus, for example, looking at scanline 1 of the character row of FIG. 3, the stroke bits for the "T" begin being shifted out of the register 310 at a reference time $t = 12$. For the last scan line of the character row (there being, for example, 28 scan lines in a row as indicated in the above-referenced patent), the stroke bits for the "T" will again begin to be read out at $t = 12$, but in this case there will be no actual "on" stroke bits for the "T" until the stem of the "T" is reached. However, it is necessary, even during the beginning of the stroke bits for the "T", that the remaining stroke bits for the "L" be included in the composite video being formed. This is achieved by the auxiliary shift register 30 which stores the last M bits (in the present embodiment $M = 15$ since this is the maximum overlap utilized) of the first character of the pair sequence so that these stroke bits are available during the beginning of the readout of the stroke for the next character of the pair sequence ("T" in this case). The readout of stroke bits from the auxiliary generator 30 is enabled by the downcounter 60 via AND gate 35, so that the number of "saved" stroke bits from the previous character is a function of the preset output of the overlap sense memory 50 (as selected when the system is configured).

In the case of scanline 28 in FIG. 3, after the first 12 stroke bits of the "L" have been read out, the stroke memory 305 will dump the stroke bits for the "T" into register 310 and the last four stroke bits of the "L" will be lost from register 310. However, the last 4 stroke bits will still be in the last four stages of the auxiliary register 30 whose 15 stages are in parallel with the last 15 stages of the shift register 310. Also, as previously described, the overlap sense memory will have loaded a count of "0100" (8 in decimal form) into the down counter 60, so that during the next 8 clock pulses the downcounter will generate an output which, in turn, enables the AND gate 35 and allows the last 4 stroke bits of the "L" to be passed through the OR gate 36 and become part of the composite video. (The same is also true for the 4 inter-character space clock pulses, but these do not manifest themselves as active video.)

The invention has been described with reference to a particular embodiment, but variations within the spirit and scope of the invention will occur to those skilled in the art. For example, it will be evident that the invention can be utilized in conjunction with a system which does not generate proportionally spaced characters and wherein the production of bits from a stroke generator is determined by timing signals which are not generated from a "spacer detector" type of subsystem. Also, it will be understood that the particular character pair sequences selected for an overlap function and the amount of overlap attributed thereto is a matter of design choice. Further, in this context, it will be understood that while alphanumeric characters are useful for describing the invention, the principles of the invention apply equally well to any characters or symbols to be displayed.

I claim:

1. In an apparatus for receiving a sequence of character-representative signals and for generating video control signals which are suitable for controlling a scanned display to present the sequence of characters on the display, said apparatus including timing generator means for generating timing signals which are synchronized with the display scan; character storage means for storing the character-representative signals and periodically reading out character-representative signals which correspond to a character in the sequence; and stroke generator means responsive to the timing signals and the character-representative signals for producing a stroke of a character to be displayed; a subsystem for presenting predetermined adjacent characters among said sequence in overlapping positions on the display, comprising:

- means for sensing the successive occurrence of at least one preselected pair of character-representative signals and for thereupon generating an occurrence indication;
- means responsive to said occurrence indication for accelerating the readout of the stroke of the second-occurring of said preselected pair of characters;
- means for storing the last-occurring portion of the stroke of the first-occurring of said preselected pair of characters; and
- means for reading out said stored stroke portion in conjunction with the stroke of the second-occurring of said preselected pair of characters.

2. The system as defined by claim 1 wherein said stroke generator means comprises a stroke memory and a parallel-in-serial-out register and wherein said means for storing the last-occurring portion of the stroke of the first-occurring of said preselected pair of characters comprises an auxiliary register in parallel with at least a portion of said parallel-in-serial-out register.

3. The system as defined by claim 2 further comprising means for combining the output of said parallel-in-serial-out register and said auxiliary register.

4. Apparatus as defined by claim 3 wherein said means for sensing comprises a memory adapted to store preselected overlap times for predetermined character pair sequences.

5. Apparatus as defined by claim 4 wherein the output of said memory which stores overlap times is adapted to enable the combination of said auxiliary register output with said parallel-in-serial-out register.

6. Apparatus as defined by claim 4 wherein the acceleration of readout of the stroke of the second-occurring of said preselected pair of characters is a function of the stored overlap time for the pair of characters.

7. Apparatus as defined by claim 6 further comprising timing means responsive to said stored overlap times for controlling readout from said auxiliary register.

8. In an apparatus for receiving a sequence of character-representative signals and for generating video control signals which are suitable for controlling a scanned display to present the sequence of characters on the display, said apparatus including timing generator means for generating timing signals which are synchronized with the display scan; character storage means for storing the character-representative signals and periodically reading out character-representative signals which correspond to a character in the sequence; and stroke generator means responsive to the timing signals and the character-representative signals for producing a stroke of a character to be displayed; a subsystem for presenting predetermined adjacent characters among said sequence in overlapping positions on the display, comprising:

- means for sensing the successive occurrence of preselected pairs of character-representative signals and for thereupon generating an occurrence indication, said sensing means including a memory adapted to store preselected overlap times for predetermined character pair sequences; and
- means responsive to said occurrence indication for accelerating the readout of the stroke of the second-occurring of a preselected pair of characters.

9. Apparatus as defined by claim 8 wherein the acceleration of readout of the stroke of the second-occurring of said preselected pair of characters is a function of the overlap time for the pair of characters.

* * * * *